Patented Aug. 13, 1940

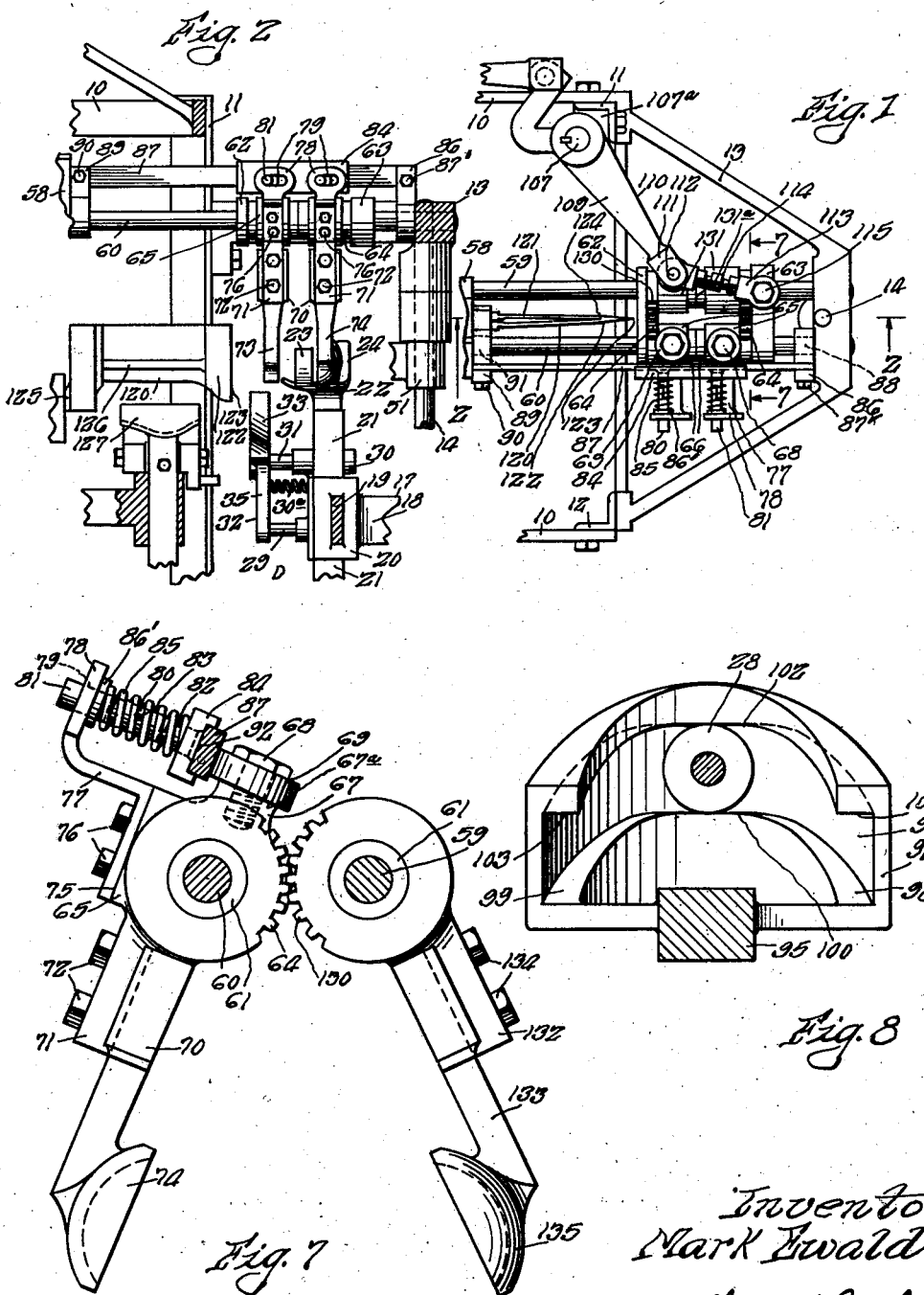

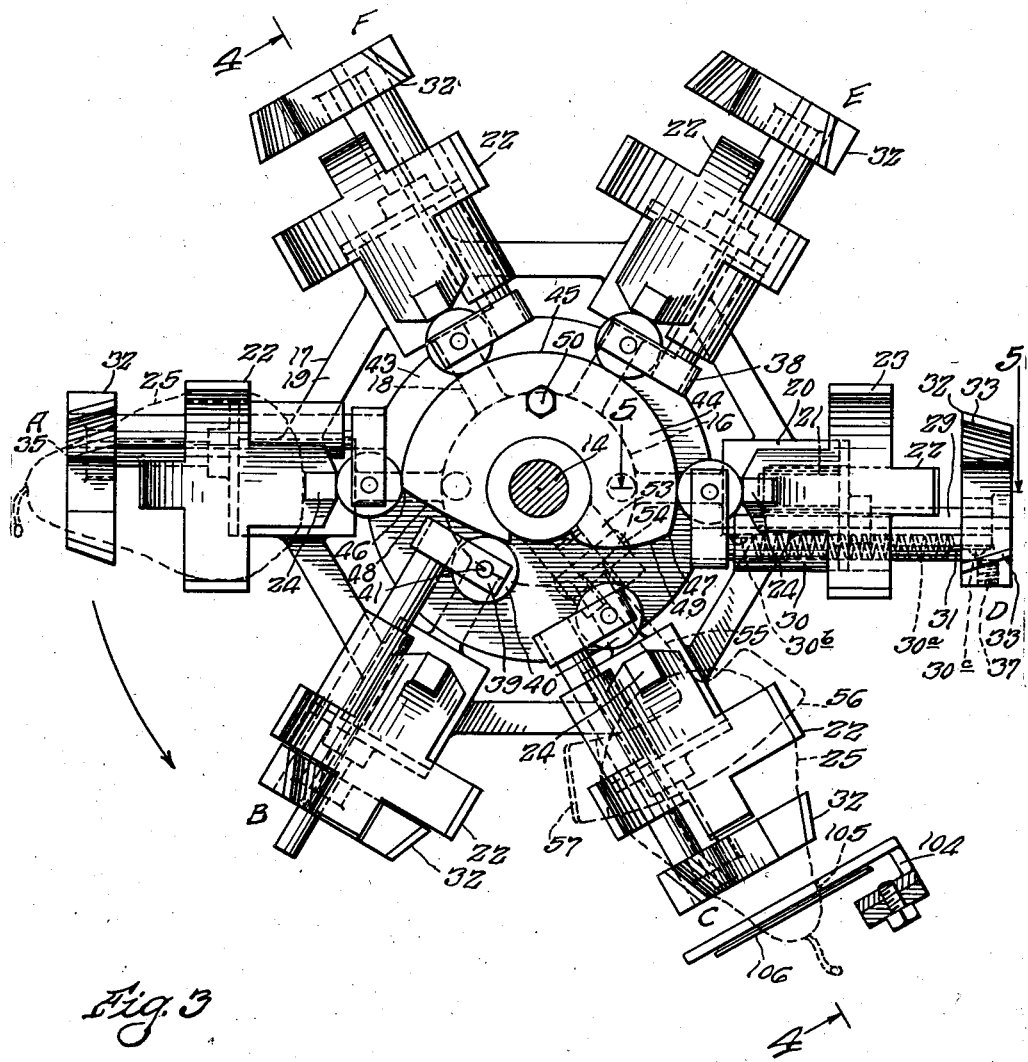

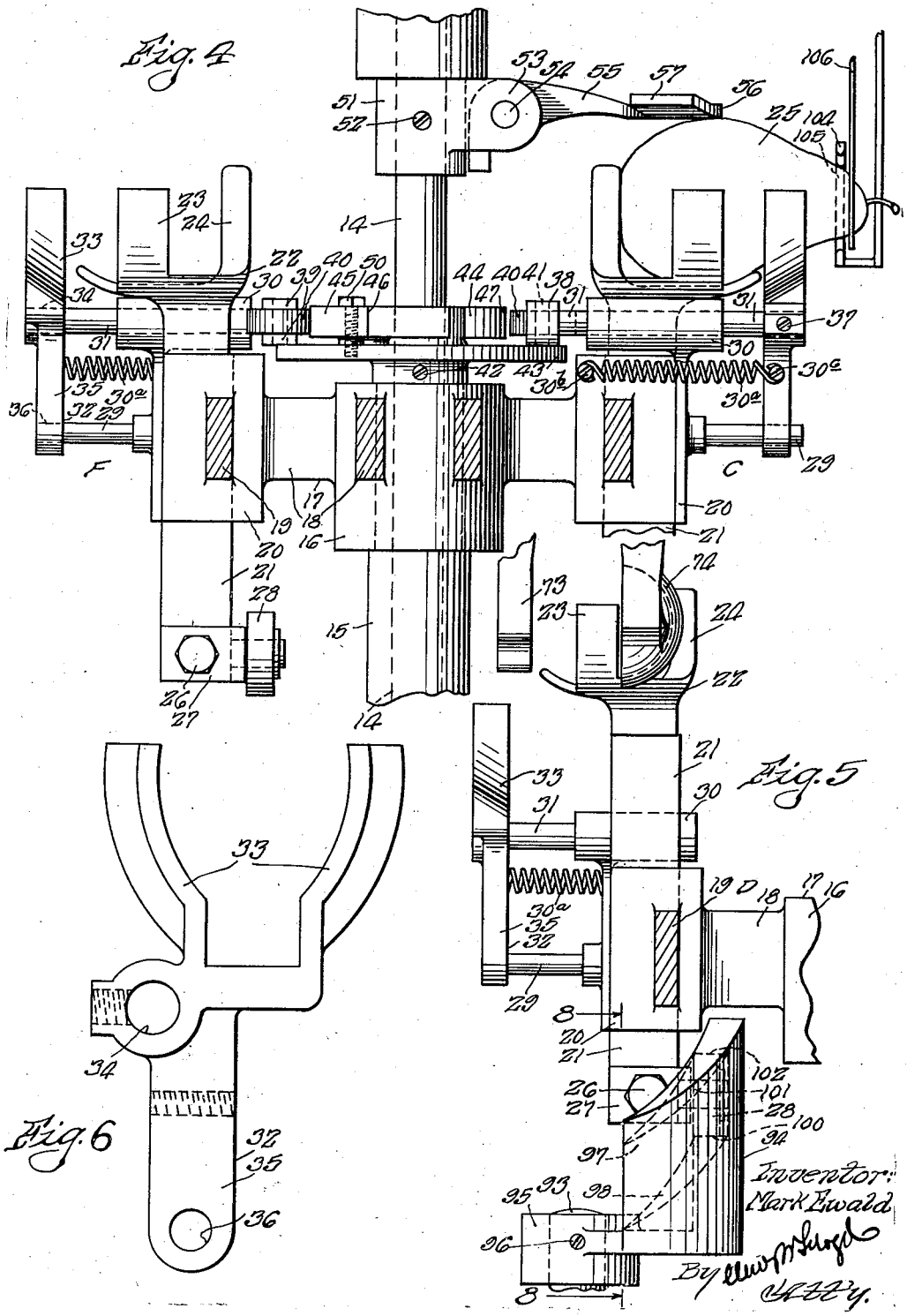

2,210,908

UNITED STATES PATENT OFFICE 2,210,908

FRUIT TREATING APPARATUS

Mark Ewald, Olympia, Wash., assignor to Special Equipment Company, Portland, Oreg., a corporation of Oregon Application July 11, 1932, Serial No. 621,914
Renewed February 8, 1939

32 Claims. (Cl. 146—51)

This invention has to do with a machine for treating fruit, specifically pears, and relates particularly to a mechanism forming a part of a fruit treating machine and to a mechanism for feeding fruit into the machine.

Those engaged in the fruit canning industry have, the same as have those of other industries, been pressed by added competition in the field and economic conditions to look to improved and better operating methods. Machinery has replaced hand labor in the handling of a fruit so far as possible, and especially is machinery used in accomplishing those operations which are uniform and are not necessarily different for each individual fruit. Because of the comparative inflexibility of known mechanical devices, many difficulties are encountered when an attempt is made to apply such devices to the treatment of a fruit so peculiarly shaped and so consistently irregular in its general contour as the pear.

Among the objects of my invention are to provide a machine for effectively holding and performing certain requisite preliminary operations upon whole fruit, specifically pears, and for feeding the fruit to other instrumentalities for subsequent processing thereby; to provide a machine having means for holding a whole fruit, specifically pears, while bobbing the stem end of the fruit, which machine includes additional means for gripping and/or holding or transporting the bobbed fruit from the first holding means to a subsequent processing station such for example as a stationary splitting means or dividing knife; to provide a fruit treating machine having means for holding a whole fruit while removing at least a portion of the epidermis of the fruit, and including additional means for gripping, removing and conveying the fruit from the first holding means to other instrumentalities for further processing the fruit; to provide an automatic machine for receiving and processing whole fruit, specifically pears, including means for bobbing the stem end of the fruit.

Other more specific objects of the invention are to provide a fruit feeding mechanism wherein holding means is provided for the fruit which comprises two relatively moving members for holding the fruit therebetween; wherein automatic means is provided for causing the members to move relatively to grip the fruit firmly but resiliently during the bobbing operation, and to move relatively after the bobbing operation to cause one of said members to release the fruit while the fruit is still held by the other of said members to facilitate a subsequent transfer of the fruit from said first holding means to additional mechanisms of the machine.

Among other objects of the present invention is the provision of:

An improved form of feed cup for holding a pear while it is being stemmed and for effectively releasing the pear at a proper time so that it may be unobstructively engaged by other parts of the mechanism.

A feed cup having complemental parts disposed for directing a gripping force axially of a pear therein.

A feed turret propelled intermittently about an axis and having feed cups for holding a fruit which is detained at a station between the movements of the turret so that other parts may perform an operation upon the fruit.

An improved means for engaging from above a fruit in a feed cup.

Means, preferably weighted, cooperating with the cup and engageable with the fruit for retaining the fruit in the cup during the bobbing of the fruit.

A new and improved means for lifting and lowering a feed cup.

Complemental feeding mechanism for abducting a fruit from a feed cup into a fruit treating machine.

I have illustrated and described my invention as applied to a construction of machine especially adaptable for and to be used with pear treating and fruit treating mechanism forming the subject matter of other applications filed by me and hereinafter referred to, but it is to be understood that such exemplification of my invention is purely for the purposes of illustration and not by way of limitation, and that the invention is adaptable for various types of apparatus for processing pears and in certain instances for processing other fruit.

With the above objects, and other desirable objects in view, the invention resides in the unique combination, novel arrangement and the improved construction of its parts which are hereinafter fully described with reference to the accompanying drawings, hereby made a part of this specification, and in which:

Figure 1 is a plan view of a mechanism embodying the present invention and illustrating the manner in which it is attached to a pear treating machine of which it may form a part;

Figure 2 is a view in vertical section taken on the line 2—2 of Figure 1;

Figure 3 is a horizontal sectional view of the present device taken from above the feed turret;

Figure 4 is a view in vertical section taken along the line 4—4 of Figure 3;

Figure 5 is a fragmentary view in vertical section taken along the line 5—5 of Figure 3 and showing a feed cup in an elevated position;

Figure 6 is an enlarged view of a fruit gripping member complementary to a feed cup;

Figure 7 is a fragmentary view in vertical section taken along the line 7—7 of Figure 1; and Figure 8 is a view taken in vertical section along the line 8—8 of Figure 5 and illustrates the construction of a cam for elevating the feed cups.

Like reference characters are used throughout the following description and in the drawings for designating similar parts.

In Figure 1, horizontal cross bars 10 are shown. The said bars form a part of a frame for a machine with which the present device may be affiliated. Upright members 11 and 12 are a part of such frame of the machine to which the horizontal members are suitably fabricated, an upright member 11 also being shown in Figure 2.

Projecting forwardly from the front of the frame for the machine of which the present device is a part is a trapezoidal frame member 13. A rod 14 is mounted vertically. Its upper end is mounted within the outermost portion of the frame member 13 and in a nonrotative manner. The rod 14 is also shown in Figures 3 and 4. Supporting the lower end of the rod 14 is a second frame member (not shown) which projects from a lower portion of the frame of the main machine.

Rotatively placed upon the bottom of the rod 14 is a sleeve 15. Secured to the top of the sleeve, to rotate therewith, is the hub 16 of a turret 17. Radiating from the hub 16 of the turret in a horizontal plane are spokes 18 in support of a rim 19, strap-like in character.

Integral with the turret at the ends of the spokes 18 and in the rim 19 thereof, are sleeves or bearings 20 having vertically extending apertures therein. The apertures through the sleeves 20 are not circular in cross section but are rectangular to conform to the stems 21 which are mounted for reciprocation therein. Attached to the upper ends of the stems 21 are feed cups 22 having side pieces 23 and a back piece 24. The pieces 23 and 24 are for holding a whole fruit, specifically a pear 25. To the lower end of each of the stems 21 and attached by means of a bolt 26 is a short arm 27 having a roller 28 journaled thereon.

Pins 29 are anchored in the side walls of the sleeves 20 to project radially of the turret. Extending horizontally from the upper walls of the sleeves 20 are horizontal bearings 30 whose axes are in parallelism with the longitudinal axis of the pins 29. Reciprocably mounted within each bearing 30 is a short rod 31 to project beyond either end of the said bearing.

Upon the outer extremity of the rods 31 are disposed stems 32 having curved opposed fingers 33. Apertures 34 are within the body of the stems 32 where the shanks 35 thereof enjoin the fingers 33. Said apertures receive the outer ends of the rods 31. In the lower ends of the stems 32 are bearings 36 which register with and receive the pins 29. The members 32 are movable toward and away from the feed cups by sliding the rods 31 within the bearings 30 and concurrently sliding the bearings 36 along pins 29.

A set screw 37 may be used for attaching the members 32 to the stems 31. At all times the fingers 33 are constantly urged toward the cups 22 by contraction springs 30a which are extended between anchorages 30b and 30c in the walls of the sleeves 20 and in the stems 32. To the inner ends of the rods 31 are securely fastened yokes 38. Between vertically alined and opposed elements 39 of the yokes 38 are disposed rollers 40 each to rotate about a vertical axis, and held in place by means of a short pin 41.

A circular plate 43 is secured to the rod 14 by means of a set screw 42 which holds it in a fixed position. The plate 43 is in a horizontal plane coinciding with the lower edge of the yokes 38 so that the latter ride lightly thereon as the turret 17 is rotated. Just above the plate 43 and about the shaft 14 is placed a plate cam 44.

The greater portion of the periphery of the cam 44 is formed as an arcuate edge 45. Opposed to the edge 45 and between extremities 46 and 47 thereof is a fall comprising camming surfaces 48 and 49. There is a bolt 50 which is inserted into an aperture within the cam 44 to project below said cam and into the plate 43, to couple the two members directly together. Positioning of the cam 44 in a selected relationship vertically, or angularly, of the rod 14, is then accomplished by loosening the set screw 42 and then tightening said set screw after the desired position is obtained.

A short sleeve 51 is secured above the cam plate 44 and to the shaft 14 by means of a set screw 52. Opposite ears 53 project radically from the sleeve 51 and are commonly apertured for receiving a pin 54 about which an arm 55 may pivot in a vertical plane. At the end of the arm 55 is a weight in the form of a plate 56. The plate 56 is suspended at a radius from the shaft 14 to place it over the path of travel of the feed cups about the shaft 14 and an end 57 thereof is turned up for a reason later to be described.

Suspended between the forward portion of the trapezoid frame member 13 and a support 58 within the pear treating machine are parallel rods 59 and 60 which serve as a track upon which a transfer carriage for the fruit may ride.

The carriage consists of sleeves 61 slidably placed upon the rods 59 and 60 and commonly fastened together at their confronting ends by end pieces 62 and 63 which are suitably apertured for receiving the rods 59 and 60. Rotatively positioned upon the sleeves 61 are pairs of segmental gears 64 and 130. Gears 64 and 130 are placed in pairs with one pair against the end piece 62 and the other pair against the end piece 63. Short sleeves 65 project from the opposed faces of the gears 64. Between sleeves 65 are washers 66.

Extending from the tops of the sleeves 65 are bosses 67 with flat faces 67a drilled and tapped for the reception of bolts 68. Rotatively held contiguous to the faces 67a are rollers 69. Depending from the lower side of the sleeves 63 are fruit gripping clamp members 70. Lugs 71 integral with the lower portion of the sleeves 65 provide a support to which the fruit clamping members 70 are secured by bolts 72. The lower extremity of the innermost clamping member 70 has a jaw 73 which is curved to conform with the periphery of the neck of a pear. The lower portion of the outermost clamping member 70 forms a jaw 74 in much the shape of a semi-scoop and having a heel portion for engaging the butt end of a fruit as well as a portion for engaging the side of the fruit. Attached to a flat face 75 of each of the sleeves 65 by means of bolts 76 is a bracket 77. Upturned ends 78 of the brackets 75

77 are each apertured at 79 to loosely receive one end of a jointed rod 80. The members 81 and 82 of each rod 80 are pivotally connected by a pin 83 so that the central portion of the rod 80 may buckle in a vertical plane. Commonly secured to the extended ends of the rod sections 82 is a shoe 84, and between shoe 84 and the upturned portions of the brackets 77 and about the rods 80 are compression springs 85 and washers 86. The washers 86 are adjacent to the upturned sections 78.

Pivotally mounted upon the rod 60 is a bar 87 of a substantially flat cross section. The front end of the bar 87 is held within the end of a short arm 86' by means of a bolt 87'. The arm 86' has a bearing 88 disposed about the rod 60. The opposite end of the bar 87 is similarly mounted within the end of a short arm 89 by means of a bolt 90.

There is a bearing 91 within the arm 89 so that the latter is free to pivot about the rod 60. The length of the arms 86' and 89 determine the radius of the arc within which the rod 87 may swing about the rod 60. Within the face of the shoe 84 which is presented to the bar 87 is a groove 92 for the reception of the bar. Because of the constant urge of the springs 85, the shoe 84 is constantly held against the bar 87.

Segmental gears 130, which mesh with gear 64, are disposed to rotate about the sleeve 61 upon the rod 59. Projecting downwardly from the sleeves 131 which are integral with the gears 130 are bosses 132 to which clamping members 133 are held by means of bolts 134. Washers 131a are interposed between the sleeves 131. If desired, the clamping members 70 and 133 may be cast as integral parts of the bosses 71 and 132. The lower end of the innermost member 133 is formed as a curved jaw (not shown) similar to and for cooperation with the jaw 73. The outermost member 133 is provided with a jaw 135 identical with jaw 74. Because of the interaction of the gears 64 and 130, rotation of the gears 64 to carry the members 70 toward the members 133 will cause the gears 130 to rotate in the opposite direction to carry the members 133 toward the members 70.

A Geneva cam arrangement (not shown) is attached to the bottom of the sleeve 15 for imparting an intermittent rotative movement to the sleeve 15, and hence such a movement to the turret 17. About the vertical rod 14 are definite stations designated by the letters A, B, C, D, E, and F. The Geneva cam is so arranged that each movement imparted to the turret will advance a fruit cup the distance between adjacent stations. Each time that the turret is halted in its movement, there will be a cup at each of the above stations.

In the lower part of Figure 5 will be seen the upper end of a shaft 93 which is a part of the Geneva cam arrangement hereinabove mentioned. The shaft 93 is a part of a uniformly rotating element of the Geneva cam and carries at its upper extremity a curved cam plate 94 projecting from the side of an apertured sleeve 95. A set screw 96 holds the sleeve 95 in a non-rotative assembly with the shaft 93. Within the concave face of the cam 94 is a channel 97. The lower side of the channel 97 includes an inclining face 98 and a declining face 99, the two being on either side and merging into a flat face 100. The groove 97 is symmetrically arranged and the upper side comprises an inclined surface 101, a flat surface 102, and a declining surface 103.

There is a fixed vertical distance between the upper and lower walls of the groove 97 at all vertical sections throughout its length, this distance being sufficient to accommodate the passing of the roller 28 through the groove.

Fruit may be placed within any of the cups at stations E, F, or A after the machine proper and the present device have been set in motion. By an intermittent movement imparted to the turret, the cup at A is advanced toward stations B. The roller 40 passes beyond the point 46 of the cam 44 and moves toward the shaft 14 under the urge of spring 30a. This spring forces the fingers 33 of the member 31 inwardly against the shoulder of the fruit 25 which has been manually placed within the cup with its stem end outwardly.

Thus, when the fruit arrives at station B, it is securely held between side members 23, the back member 24 of the cup 22, and is impingedly held against the back member 24 by the fingers 33. The next movement given the turret 17 will move the pear from station B to station C. During this movement the plate 56 which falls within the path of the traversing pear is lifted by the pear brushing against the upturned section 57 so that the weight of the plate 56 will be supported by the pear when it arrives at station C.

It is to be understood that the upturned edge 57 of the plate is to the left of station C, as is seen in Figure 3, while the main body of the plate is directly above station C.

It is because of the bobbing operation which takes place at station C that the plate 56 is employed in addition to the fingers 33 for holding the pear in its place within the cup. In Figures 3 and 4 is shown a plate 104 which has a notch 105. Associated with the plate 104 is a blade 106 which is disposed to snip the extended end from the pear after such end thereof has been brought within the notch 105. It is not until after the fruit has arrived at station C that the end clipping mechanism is brought into association with the pear. After the end has been removed from the fruit the clipping, or bobbing, mechanism is retracted so that there will be no interference with the progression of the fruit to station D pursuant to the next motion imparted to the turret.

Reference should be had to a copending application for Letters Patent, entitled Bobbing device, (Mark Ewald, Serial Number 621,857, filed July 11, 1932), to determine the exact operation of the plate 104 and the blade 106 claims to the bobbing knife and its operating mechanism being presented in said copending application.

While passing from station C to D, the roller 40 is carried into contact with the camming surface 49 of the cam 44, and consequently causes an outward displacement of the rod 31 and the fingers 33 attached thereto. By the time the pear arrives at station D, the fingers 33 are entirely removed from the pear. As the pear is moved from station C to station D, it passes from beneath the plate 56 to allow the latter to drop down and be engaged by the next succeeding pear. Then it wil be seen that when the fruit arrives at station D, it is lying freely within the cup 22 to be easily engaged and lifted therefrom by certain transfer or conveying members.

Directly below station D is positioned the cam 94. As soon as the cup arrives at station D, the shaft 93 has turned to such a degree that the lower camming edge 98 engages the roller 28. The roller 28 passes upwardly along the surface 98 across the camming face 100 where the feed cup is elevated and is held at constant elevation and then forced downwardly by the contact of the upper side of the roller with the camming surface 103. As soon as the roller 28 is passed by the lower extremity of the camming surface 103, the turret 17 is given another impulse to deliver the cup from station D to station E. While the feed cup is elevated and supported at a constant elevation by the surface 100 of the cam 94, the fruit clamps 70 and 133 of the transfer means or carriage hereinabove described engage the fruit and abduct it therefrom for feeding into a further processing machine.

In Figure 1 is shown a vertical shaft 107 disposed within the corner of the upright 11 and journalled within a bearing provided by a bracket 107a. Shaft 107 has imparted thereto an oscillating movement by any suitable mechanism such, as for example, as disclosed in my copending application, Serial No. 201,838, filed on April 13, 1938. Keyed to the upper end of the shaft 107 is a lever arm 109. The longer element 110 of said arm 109 is bifurcated at its end, and has pivotally contained between its bifurcations 111 by means of a pin 112 an end of an adjustable link 113.

By turning a nut 114, the link 113 may be adjusted as to length. Within the upper face of the end piece 63 of the carriage is pivotally anchored the opposite end of the adjustable link 113 by means of a bolt 115.

While the shaft 107 is being turned in a clockwise direction, as seen in Figure 1, for moving the fruit carriage inwardly toward the fruit treating machine, the bar 87 is revolved in a counterclockwise direction about the rod 60 as seen from the right of Fig. 1, and the clamps 70 and 133 are forced together. The jointed rods 80 permit the bar 87 to revolve freely about the rod 60 while actuating, through the springs 85, the brackets 77. When the shaft 107 is rotated in the opposite direction the bar 87 is also displaced about the shaft 60 in the opposite direction so as to spread the clamps 70 and 133. Actuation of the bar 87 is caused by a cam mechanism described in detail in my Patent Number 1,979,322, issued November 6, 1934. The cam (not shown) coacts with the arm 89 to oscillate the latter about the rod 60. There is a common source of power for all parts of the device herein described and for the machine of which it is a part. The various linkages for operating the parts of the machine are correctly timed for proper coordination.

At the time the fruit cup is elevated to the plane section 100 of the cam 94, or slightly before, the fruit carriage is moved by the lever 109 to its outermost position with the clamps 70 and 133 in the spread position. Simultaneous with the arrival of the roller 28 upon the camming surface 100 the bar 87 is given a turn in a counterclockwise direction to move the jaws of the clamping members about the fruit. The jaws 74 and 135 will engage the butt of the fruit by passing between the side pieces 23 and the back piece 24 of the turret carried fruit holding cups. By the time the cam 94 has rotated sufficiently to pass the roller to the following extremity of the flat section 100, the clamping members 70 and 133 have completely engaged the fruit so that when the camming surface 103 lowers the feed cup 22, the fruit will be lifted therefrom and held within the jaws of said members. After the fruit cup 22 has been lowered sufficiently for the transfer jaws to clear the cup side pieces 23, the lever 109 is given a turn in a clockwise direction, as seen in Figure 1, to propel the carriage inwardly toward the fruit treating machine.

By removing or inserting washers such as 66 and 131a, the sleeves 65 and 131 may be placed nearer to or farther from one another and consequently the fruit clamps depending therefrom may be adjusted to accommodate fruit of different sizes. It will be noted that the apertures 79 are extended in a horizontal direction so that the jointed rods 80 may slide therein when such adjustment is made.

The operating mechanism for the bar 87 holds the bar in its limiting position in the counterclockwise direction all the while that the carriage is being moved inwardly to hold the clamps 70 and 133 together. During this inward movement, the shoe 84 slides along the bar 87.

The springs 85 form means to preclude injury to the fruit which otherwise might be caused by the clamps 70 and 133 if they were positively driven to a fixed position in closing. When the bar 87 is revolved in a counterclockwise manner, as seen from the right of Fig. 1, pressure is exerted against the shoes 84, against the jointed rods 80, and against the springs 85. Such construction allows the clamps 70 and 133 to be brought into proper relative position to clamp fruits of different sizes without injury thereto, the springs 85 holding the clamping jaws in resilient or yielding engagement with the fruit.

There is a continued counterclockwise movement of the bar 87 after the clamping members have initially engaged the fruit and this movement carries the bar 87 away from the rollers 69 and forces the jointed rods 80 through the apertures 79 thereby exerting a torsional force against the upturned portion 78 of the bracket 77 by compression of the springs 85. Thus the pressure against the fruit is increased without forcing the jaws of the clamping members into the fruit. Since the bar 87 is retained in a counterclockwise position during the movement of the fruit carriage inwardly of the machine, the gripping effect of the clamping members upon the fruit is maintained so that the fruit will not be dropped.

In Figures 1 and 2, there will be observed a splitting device comprising two leaf like members 120 and 121. The forward end of the member 120 configures a cuneiform section 122 with a vertical sharpened edge 123. There is a notch 124 at the back of the cuneiform section 122 into which the end of the member 121 may seat flatly and as a continuation of the contiguous surface of the cuneiform configuration.

At the inner end of each of the members 120 and 121 is a stem 125 about which they may pivot for parting. There is a mechanism (not shown) for spreading the members 120 and 121 and for bringing them together again in the properly timed intervals. On the outer surface of either of the members 120 and 121 will be seen a narrow rib 126.

The mechanism for operating the blade members 120 and 121 is so timed that said members will be together as shown in Figure 1 at the time the fruit carriage is being propelled inwardly toward the machine. When the fruit enters the machine the edge 123 of the blade 120 coincides with the axis of the conducted fruit and passes longitudinally through the fruit as it is carried into the machine. The blade 120 divides the fruit equally or into halves. Subsequent to the conducting of the fruit to be split by the blade as described and after the clamping members 70 and 133 have been spread and the carriage reversed in its direction and moved clear of the divided fruit, the mechanism operating the parts 120 and 121 spreads them whereby the halved fruit is deposited into fruit cups 127. After the fruit is placed within the cups 127 for further treatment, the present feeding mechanism has performed its function and the carriage is again moved forwardly to engage another fruit.

This splitting and spreading device, the operating mechanism therefor, the transfer mechanism and the operating mechanism for the latter, are more fully disclosed in the Ewald copending application, Serial No. 201,838, filed April 13, 1938, wherein they are claimed per se and in combination.

What is claimed to be new and is desired to be secured by Letters Patent of the United States is:

1. In a fruit treating device the combination of a movable fruit holding carriage, clamps depending from said carriage and having jaws adapted to close about a fruit, a movable feed cup for holding fruit and having sides with notches therein, means for moving said carriage to and from a position registering said clamps with said notches, means for moving said clamps through said notches and into engagement with fruit in said cup, and means operable subsequently to the actuation of said clamp moving means and prior to an actuation of said carriage moving means for moving said cup away from said carriage.

2. In a fruit treating device, a fruit holding cup comprising walls having parallel slots therein, a conveyor movable in a direction transverse of said slots and comprising opposed complemental fruit clamps of a width less than the width of said slots and registering therein, means yieldingly urging said clamp members into said slots to engage a fruit in said cup, and means for moving said cup in a direction parallel to the direction of said slots subsequently to such engagement of a fruit by said clamp members.

3. In a fruit treating device, a feeding mechanism comprising a fruit holding cup having a wall with notches therein, fruit holding means movable toward and away from said cup and comprising opposed complemental clamp members, means for moving said clamps transversely of said cup into the notches in the walls of said cup and into yielding engagement with a fruit in said cup, and means for thereafter moving said cup and said clamp member apart with the fruit retained between said clamp members.

4. In combination, a fruit loading member movable in a horizontal plane, a fruit feeding turret, fruit receptacles vertically movable on said turret, and means for actuating said receptacles vertically to register one after another with said movable loading member for feeding fruit from a registered receptacle into said loading member.

5. In combination, a horizontally reciprocable carriage having a loading station at one end of its reciprocal path, means at said station for loading fruit one at a time into said carriage, comprising a fruit receiving device having a plurality of vertically movable fruit receiving cups, and means for moving said cups vertically for registration one after another with said carriage for the transfer of such fruit from said cups to said carriage.

6. In combination, a fruit conveying carriage reciprocating in a horizontal plane, a turret having a plurality of fruit receiving cups vertically reciprocal thereon, and means for reciprocating said carriage and reciprocating said cups synchronously so that said cups one after another register with said carriage to discharge fruit into the latter.

7. In combination, a horizontally reciprocable loading member having a fruit receiving station, means for reciprocating said member to and from said station, a turret having sleeves spaced thereabout, a fruit holding receptacle in each of said sleeves and reciprocable vertically therein, and means for vertically reciprocating said receptacles one at a time in synchronism with successive reciprocations of said loading member to register each receptacle in seriatim with said loading member for the discharge of fruit from the former into the latter.

8. In combination, a horizontally reciprocable receiving member having a loading station, means for reciprocating said member, a rotatable feeding device comprising a series of fruit holding means each holding a single fruit, holding means engaging the exposed surface of a fruit in one of said holding means, means for reciprocating said cups to register one at a time with said receiving member to discharge fruit onto the latter, and means for rendering said holding means ineffective prior to the registration of the holding means containing the fruit with said reciprocating member.

9. In a fruit bobbing apparatus the combination of fruit feeding mechanism comprising rotatable means having spaced fruit holding means thereon, complemental fruit holding means associated with said first holding means comprising yieldingly displaceable means, fruit bobbing means in the path of fruit in said fruit holding means, movable loading means with which said fruit holding means register one after another, and means for rendering said holding means effective while fruit is moved past said fruit bobbing means and ineffective when said fruit holding means registers with said loading means.

10. A fruit loading apparatus comprising fruit holding means adapted to hold a fruit and movable in one path, means for cutting the fruit while so held, a second fruit holding means movable in another path substantially intersecting the path of movement of the first fruit holding means, said second fruit holding means comprising relatively movable jaws, and means for relatively opening and closing said jaws, and means for moving both said fruit holding means to the point of the intersection of the paths of their movements with the jaws of said second holding means open to receive the cut fruit therebetween, means for thereafter closing said jaws, and for subsequently moving the first fruit holding means away from such point of intersection.

11. In combination, a horizontally reciprocable receiving member having a loading station, means for reciprocating said member, a rotatable feeding device comprising a series of fruit holding means, each holding a single fruit, means yieldingly engaging the exposed surface of a fruit in one of said holding means, means for vertically reciprocating said holding means to register one at a time with said receiving member to discharge fruit into the latter, and means for rendering said holding means ineffective prior to the registration of the holding means containing the fruit with said reciprocating member.

12. In an automatic machine for treating pears the combination of means forming a plurality of fruit holding means each comprising relatively movable members adapted firmly to hold pears therebetween, bobbing means, means for moving said members relatively to cause them to engage the pear while bobbed, means for actuating the bobbing means while said pear is so held, means for moving said members after the bobbing operation to cause one of said members to disengage from the pear, leaving the other member holding the pear, and additional holding means adapted to grip the pear and remove it from the holding member in which it is loosely held, and for conveying the pear to another station for subsequent operation thereon.

13. In a fruit treating apparatus the combination with a fruit holder for receiving and holding a whole pear comprising a plurality of holding means, a portion of the holding means adapted to engage the neck portion of the pear, means for producing relative movement between the butt holding portions and the neck holding portions whereby firmly to grip the pear at a predetermined time, means for bobbing the pear while the pear is held firmly by said butt and neck holding means, means for causing relative movement between butt and neck holding means to substantially release the firm grip of said holding means, means for bodily shifting one of said holding means out of the plane formerly occupied by said common holding means during the bobbing operation whereby to carry with it the bobbed pear, said last mentioned holding means substantially loosely engaging the pear in such shifted position, and additional pear holding means adapted to engage the pear and shift it bodily.

14. In a pear treating apparatus the combination of a pear holding means comprising holding means adapted substantially loosely to engage the butt end of the pear and holding means shiftable relatively to the first mentioned holding means for engaging the neck of the pear, means for shifting said holding means relatively to cause the same firmly to grip the pear and hold it, means for bobbing the neck end of the pear while so held, means for bodily shifting one of said holding means away from the original holding position in which the pear was bobbed thereby leaving the pear substantially loosely held by the other holding means, additional holding means adapted to grip the pear and remove it from the holding means in which it is loosely held and for conveying the pear to another station for subsequent operation thereon.

15. In a pear treating apparatus the combination of holding means comprising a substantially cup-shaped member having spaced apart holding arms including an abutment arm adapted to abut the butt end of the pear and loosely to hold the pear, a cooperative holding means comprising spaced jaws adapted to engage opposite sides of the neck of the pear, means for relatively shifting said holding means to cause the pear firmly to be held therebetween, means for bobbing the pear while so held, means for automatically shifting the neck holding means away from the first mentioned holding means whereby to permit the pear to be loosely held by said first mentioned means, means for moving the first mentioned holding means out of the position it occupies during the bobbing operation, additional holding means adapted to be moved into position to engage the pear loosely held in said first mentioned holding means and to carry the pear to a second station.

16. In a pear treating apparatus the combination of holding means comprising a substantially cup-shaped member having spaced apart holding arms including an abutment arm adapted to abut the butt end of the pear and loosely to hold the pear, a cooperative holding means comprising spaced jaws adapted to engage opposite sides of the neck of the pear, means including a resilient member for relatively shifting said holding means to cause the pear firmly but yieldably to be held therebetween, means for bobbing the pear while so held, means for automatically shifting the neck holding means away from the first mentioned holding means whereby to permit the pear to be loosely held by said first mentioned means, and additional holding means adapted to be moved into position to engage the pear loosely held in said first mentioned holding means and to carry the pear to a second station.

17. In combination, a horizontally reciprocal fruit receiving member having a loading station, a rotatable feeding device comprising a series of fruit receiving means, each receiving a single fruit, means yeildingly engaging the exposed surface of a fruit in said receiving means to hold the fruit therein, means for vertically reciprocating said receiving means successively to register one at a time with said receiving member to discharge fruit into the latter, and means for rendering said yielding means ineffective prior to the registration of the receiving means containing the held fruit with said reciprocable receiving member.

18. In combination, a rectilinearly shiftable fruit feeding member having a loading station, a rotatable feeding device comprising a series of fruit receiving members shiftable parallel to the axis of rotation, each of said members receiving a single fruit, means yieldingly engaging the surface of a fruit in a receiving member to hold the fruit therein, means for successively shifting said receiving members parallel to their axis of rotation to register one at a time with said rectilinearly shiftable fruit feeding member to discharge fruit into the latter, and means for rendering said holding means ineffective prior to the registration of the receiving member containing the fruit with said fruit feeding member.

19. In an automatic machine for treating fruit, the combination of means forming a plurality of fruit holding means, each comprising relatively movable members adapted firmly to hold whole fruit therebetween, bobbing means, means for moving said members relatively to cause them to hold the fruit while being bobbed, means for actuating the bobbing means while the fruit is so held, means for moving said members relatively after the bobbing operation to cause one of said members to disengage from the fruit, leaving the other member holding the fruit, means for removing the fruit from the fruit holding means, and means for moving the member holding the bobbed fruit into registry with said removing means for removing the fruit from said member.

20. In a fruit treating apparatus, the combination of holding means comprising a fruit receptacle having spaced apart holding arms including an abutment arm adapted to abut the butt end of the fruit and loosely to hold the fruit, a cooperative holding means comprising spaced elements adapted to engage opposite sides of the fruit in advance of said receptacle, means for shifting said receptacle and said cooperative holding means relatively to cause the fruit firmly to be held therebetween, means for bobbing the fruit while so held, means for automatically shifting the holding means in one direction and away from the receptacle whereby to permit the fruit to be loosely held by said receptacle, means for moving the receptacle in another direction and out of the position it occupies during the bobbing operation, and additional holding means adapted to be moved into position to engage the bobbed fruit loosely held in said receptacle and to carry the fruit to a second station.

21. In a fruit treating device, the combination of horizontally movable transfer means, means for moving said transfer means rectilinearly along said horizontal path, a pair of jaws movably mounted on said transfer means for movement with said transfer means, said jaws being movable at right angles to said rectilinear path, means for so moving said jaws to cause them to approach each other and to recede from each other, a vertically movable fruit holder movable from a position below said horizontal path into a position intersecting said path, said fruit holder having spaced apart fruit engaging walls, the space between said walls registering with the position of the jaws of said transfer means when said fruit holder is moved into position to intersect the path of movement of the transfer means, and synchronously operated power actuated means for vertically shifting the fruit holder with the fruit carried loosely therein to a predetermined position, for thereafter horizontally shifting the transfer means to cause its jaws to register with the opening between the fruit holding walls, for thereafter causing said jaws to approach and grip the fruit, for thereafter lowering said fruit holder away from said jaws, and for thereafter horizontally moving said jaws to a remote position.

22. In a fruit preparation machine, a stationary support, a rotary turret on said support and provided with fruit supporting means, a splitting blade disposed on said stationary support and disposed in spaced relation from the path of movement of the fruit supporting means when moved by said rotary turret, longitudinal guide means on said support disposed parallel to the plane passing through said fruit supporting means and said splitting blade, a carrier mounted for movement along said guide means, a plurality of fruit clamping means pivotally mounted on said carrier for transferring fruit from said fruit supporting means onto the splitting blade, means for rotating said turret to bring said fruit supporting means into and out of registration with said fruit clamping members, means for reciprocating said carrier in a straight line path of movement to cause the clamping members carried thereby at one extreme position of their movement to register with a fruit on said fruit supporting means and firmly to grasp said fruit and conveying said fruit in a straight line motion and carrying it onto the splitting blade, and means for contracting and separating said clamping members in timed relation to their reciprocating movements to cause them to grasp the fruit on said supporting means and to release said fruit after carrying said fruit onto the splitting blade.

23. In a fruit processing machine, a stationary support, horizontally disposed guide means on said support, a carriage adapted to reciprocate in a straight line path of travel longitudinally of said guide means to opposite extreme positions, a plurality of fruit clamping members mounted on said carriage for reciprocatory movement therewith, a fruit turret disposed at one end of the path of travel of said clamping members, a splitting blade mounted at the opposite end of said path of travel of said fruit clamping members, said fruit turret having a plurality of spaced apart fruit holding means thereon, means for bringing each one of said fruit holding means into registration with the path of travel of said clamping members when said clamping members are at that extreme position of their path of travel nearest the turret, means for causing said clamping members to contract firmly to grasp a fruit when at such last mentioned extreme position of travel, said clamping members thereafter moving to remove the fruit from said fruit holding means on said turret and to carry the fruit in a straight line movement across and onto said splitting blade whereby to split the fruit, means for thereafter causing said clamping members to spread apart whereby to release the split halves from said clamping members, and mechanism for actuating said turret, said carriage and said clamping members in timed relation.

24. In combination, a rectilinearly shiftable fruit transfer means having a loading station at one end of its path of travel, said loading station comprising a rotatable turret having a plurality of spaced apart fruit holding members thereon adapted each to be shifted into registration with the path of movement of said rectilinearly shiftable fruit transfer means, a splitting knife disposed at the opposite end of the path of travel of the rectilinearly shiftable fruit transfer means, said fruit transfer means comprising relatively shiftable members adapted to move relatively toward each other to grasp the fruit, remove it from the fruit holding means of the turret and convey it in a straight line motion across and onto the fruit splitting knife, and means operable when said members are in said last mentioned position for spreading the relatively shiftable members to release the split halves of the fruit.

25. In a fruit preparation machine, in combination, a stationary support, horizontally disposed guide means on said support, a carriage adapted to move in a straight line path of travel longitudinally of said guide means to opposite extreme positions, a plurality of fruit clamping members pivotally mounted on said carriage for reciprocatory movement therewith, said pivotally mounted members being capable of motion toward and from each other in a direction at right angles to said straight line path of travel, a fruit turret disposed at one end of the path of travel of said clamping members, a splitting blade mounted at the opposite end of said path of travel of said fruit clamping members, said fruit turret having a plurality of spaced apart fruit holding means thereon, means for rotating said turret for bringing each one of said fruit holding means into registration with the path of travel of said clamping members when said clamping members are at that extreme position nearest the turret, means for causing said clamping members to pivot and to contract firmly to grasp a fruit when at said last mentioned extreme position of travel, said clamping members thereafter moving to remove said fruit from said fruit holding means on said turret to carry the fruit in a straight line movement across and onto said splitting blade whereby to split the fruit, said means for moving the clamping members causing said clamping members thereafter to spread apart whereby to release the split halves of the fruit from said clamping members, and mechanism for actuating said turret, said carriage and said clamping members in timed relation.

26. An automatic machine for preparing pears comprising an intermittently rotatable turret having a plurality of pear holding means, bobbing means disposed in the path of movement of the holding means and operable in succession upon the pears in said holding means as said turret moves, cutting means for severing the pears substantially along their stem axes, pear conveying means for receiving the bobbed pears from the holding means of the turret and including means for carrying each bobbed pear endwise across said severing means to halve the pear, and mechanism for actuating said turret, said conveying means and said bobbing means in synchronism.

27. In an automatic pear processing machine, the combination of a support, a turret mounted upon said support, means for intermittently rotating said turret, a plurality of spaced pear holders mounted on said turret, said holders comprising relatively movable members, actuating means synchronized with the movement of said turret for shifting said members relatively to grasp and hold a pear therebetween and thereafter to release said pear to permit the same to be moved from said fruit holder, pear bobbing means on said support and disposed in the path of movement of said turret and adapted to form a cut through the neck of the pear transversely to the stem axis of the pear while said pear is held in the fruit holder of the turret, additional fruit holding means, and transfer mechanism associated with said turret and adapted upon predetermined registration of the fruit holders of the turret with the additional fruit holding means to move the fruit from said first fruit holder toward said second mentioned fruit holder and for thereafter releasing said fruit therefrom.

28. In a fruit processing machine, a rotary turret carrying fruit supporting means, a fruit dividing blade, means including a set of clamps for transferring fruit from said supporting means onto the dividing blade, means for rotating the turret for bringing the fruit supporting means into and out of registration with said clamps, means for reciprocating said clamps in timed relation to the operation of the turret, and means for contracting and separating said clamps in timed relation to their reciprocated movements to cause them to grasp the fruit on said supporting means and to carry the fruit onto the dividing blade and thereafter to release the fruit sections.

29. In a fruit preparing machine, a rotary turret provided with spaced fruit supporting means for holding a whole fruit, cutting means for bobbing a whole fruit while on said supporting means, a fruit dividing blade, means including a set of clamps for transferring the fruit from said supporting means in succession onto the dividing blade, means for rotating the turret intermittently to bring the fruit supporting means into and out of registration with said clamps, means for reciprocating said clamps in timed relation to the intermittent movement of the turret, and means for contracting and separating said clamps in timed relation to their reciprocated movements to cause them to grasp the fruit on the supporting means in registration therewith and to carry the fruit onto the dividing blade and thereafter to release the divided fruit.

30. In a fruit processing machine, the combination of a support, a turret on said support having a plurality of fruit holders thereon, each fruit holder having relatively shiftable fruit contacting means adapted to be relatively shifted to open and closed position to hold a fruit or to release the fruit, means for rotating said turret to bring a fruit holder into a predetermined position, a fruit dividing cutter disposed in registration with a plane passing through the central portion of a fruit when so held in such position, fruit conveying means including a set of clamps for transferring fruit in succession from the holding means of the turret when said turret is in such position to cause said fruit to be transported by said fruit transfer means across said dividing cutter to halve the fruit, means for reciprocating said clamps in timed relation to the operation of the turret, and means for contracting and separating said clamps in timed relation to their reciprocating movements to cause them to grasp the fruit on the registering fruit holder of the turret and to carry the fruit onto the dividing cutter and thereafter to release the split fruit.

31. In a fruit processing machine, the combination of a support, a turret on said support having a plurality of fruit holders thereon, each fruit holder having relatively shiftable fruit contacting means adapted to be relatively shifted to open and closed position to hold a fruit or to release the fruit, means for rotating said turret to bring a fruit holder into a predetermined position, a fruit dividing cutter disposed in registration with a plane passing through the central portion of a fruit when so held in such position, fruit conveying means including a set of clamps for transferring fruit in succession from the holding means of the turret when said turret is in such position to cause said fruit to be transported by said fruit transfer means across said dividing cutter to halve the fruit, means for reciprocating said clamps in timed relation to the operation of the turret, and means for contracting and separating said clamps in timed relation to their reciprocating movements to cause them to grasp the fruit on the registering fruit holder of the turret and to carry the fruit onto the dividing cutter and thereafter to release the fruit sections, said clamps including means to engage in the rear of an enlarged portion of each pear during the transferring movement, whereby to prevent rearward movement of each pear relatively to the clamps of the transferring means during the dividing operation.

32. In a device of the class described, the combination of a support, intermittently operable means adapted to hold a pear at spaced apart portions on the pear, pear bobbing means adapted to form a cut transversely across the stem axis of the pear while so held, means for moving each pear in succession to a bobbing station to be bobbed and thereafter to move said intermittently operable means carrying said bobbed pear to a transfer station, mechanism operable to release one of said spaced pear holding means while holding the pear by means of another of said holding means when said pear arrives at the transfer station, and means associated with said transfer station for removing the pear from the remaining holding means.

MARK EWALD.

CERTIFICATE OF CORRECTION.

Patent No. 2,210,908.　　　　　　　　　　　　　　　August 13, 1940.

MARK EWALD.

It is hereby certified that error appears in the printed specification of the above numbered patent requiring correction as follows: Page 2, second column, line 31, for the word "Opposite" read --Opposed--; page 5, second column, line 23, claim 8, for "cups" read --holding means--; and that the said Letters Patent should be read with this correction therein that the same may conform to the record of the case in the Patent Office.

Signed and sealed this 1st day of October, A. D. 1940.

(Seal)　　　　　　　　　　　　　　　　　　　　　　　Henry Van Arsdale,
　　　　　　　　　　　　　　　　　　　　　　　Acting Commissioner of Patents.